US006711500B2

(12) United States Patent
Chen

(10) Patent No.: US 6,711,500 B2
(45) Date of Patent: Mar. 23, 2004

(54) METHOD FOR VEHICLE DISPATCHING SYSTEM

(75) Inventor: Stephen Chen, Chang-Hua (TW)

(73) Assignee: E-Lead Electronic Co., Ltd., Chang-Hua (TW)

( * ) Notice: Subject to any disclaimer, the term of this patent is extended or adjusted under 35 U.S.C. 154(b) by 0 days.

(21) Appl. No.: 10/097,549

(22) Filed: Mar. 15, 2002

(65) Prior Publication Data

US 2003/0176967 A1 Sep. 18, 2003

(51) Int. Cl.[7] .......... G01C 21/26

(52) U.S. Cl. .......... 701/213; 701/24; 701/207; 701/300; 340/988; 340/991; 340/993; 342/357.06; 342/357.08; 342/357.09

(58) Field of Search .......... 701/24, 33, 207, 701/213, 214, 300; 340/988, 991, 993, 994; 342/357.01, 357.06, 357.07, 357.08, 357.09, 357.1

(56) References Cited

U.S. PATENT DOCUMENTS 5,731,785 A * 3/1998 Lemelson et al. ..... 342/357.07
5,736,962 A * 4/1998 Tendler .......... 342/357.1

* cited by examiner

*Primary Examiner*—Gertrude Arthur
(74) *Attorney, Agent, or Firm*—Troxell Law Office PLLC

(57) ABSTRACT

A method for a vehicle dispatching system for controlling dispatching communications between vehicles and a control center mainly includes a control center and at least one vehicle. Every vehicle is equipped with a car phone. The control center includes a control computer and a data transmission device. The car phone consists of a broadcast receiver, a data transceiver, a GPS receiver, and a distance counter. By the method of the invention, the available vehicle nearest customers may be dispatched to meet customer service requirements at minimum communication costs.

1 Claim, 8 Drawing Sheets

METHOD FOR VEHICLE DISPATCHING SYSTEM

BACKGROUND OF THE INVENTION

1. Field of the Invention

The invention relates to a method for a vehicle dispatching system to provide dispatching communications between vehicles and a control center for dispatching the nearest available vehicle to meet customer service requirements at minimum costs.

2. Description of the Prior Art

Conventional vehicle fleet dispatching and taxi calling have many problems. Take taxi calling for instance, when a control center receives a customer call for taxi services, the control center usually broadcasts through a radio transceiver system to all taxis regard customer call information. Taxi drivers who are interested utilize the same radio transceiver system to respond vehicle conditions and desires to take the mission. The control center receives the responses and makes dispatching decision. As the control center has to transmit broadcast messages to the fleet constantly, the vehicles also are filled with broadcast noises constantly. Moreover, vehicle conditions and distances to customers are reported by vehicle owners, information accuracy is not objective. Vehicle owners who want to get business may feed the control center with a doctored distance to the calling customer to swindle the business unfairly.

Another conventional approach is to have every vehicle of the fleet to employ an information communication system to automatically report vehicle location to the control center. The control center can constantly monitor all vehicle locations of the fleet. When there is a dispatch mission, the control center can issue dispatch order readily based on the information. However this system requires every vehicle to report its location constantly, communication costs are high. It is not economically justified.

SUMMARY OF THE INVENTION

In view of aforesaid disadvantages, the invention aims to provide a method for a vehicle dispatching system that has a control center to control dispatch communication for at least one vehicle. According to the invention, every vehicle is equipped with a car phone. The control center includes a control computer and a data transmission device. The car phone includes a broadcast receiver, a data transceiver, a Global Positioning System (GPS) receiver and a distance counter. The method of the invention include the processes of: the control center receives a call requesting for vehicle such as a customer asking for taxi services; the computer in the control center calculates longitude and latitude coordinates of customer location based on customer input and through electronic maps, then emits service request commands through a broadcast system; car phones in vehicles receive the service request commands and compare with the longitude and latitude coordinates of the vehicle received from the GPS receiver, and calculate the distances between the vehicles and the customer; different distances determine return call delay of information transmission from the vehicles to the control center; the vehicle which is nearest to the customer has a higher possibility of calling back and communicating successfully first while vehicles located at longer distances have higher possibility of calling back later and not able to access the occupied communication links; when the control center accepts the first return call, it lifts the original mission commands and orders call back cancellations for those car phones that are located at longer distances and do not respond, and those car phones having tried to call back but are delayed due to line busy are revoked and treated as invalid call; hence the vehicle at the nearest distance is dispatched at minimum communication costs to resolve the dispatching problems incurred to conventional vehicle dispatching systems.

The primary object of the invention is to provide a method for a vehicle dispatching system for dispatching a nearest available vehicle to meet customer's service requirements at minimum communication costs.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
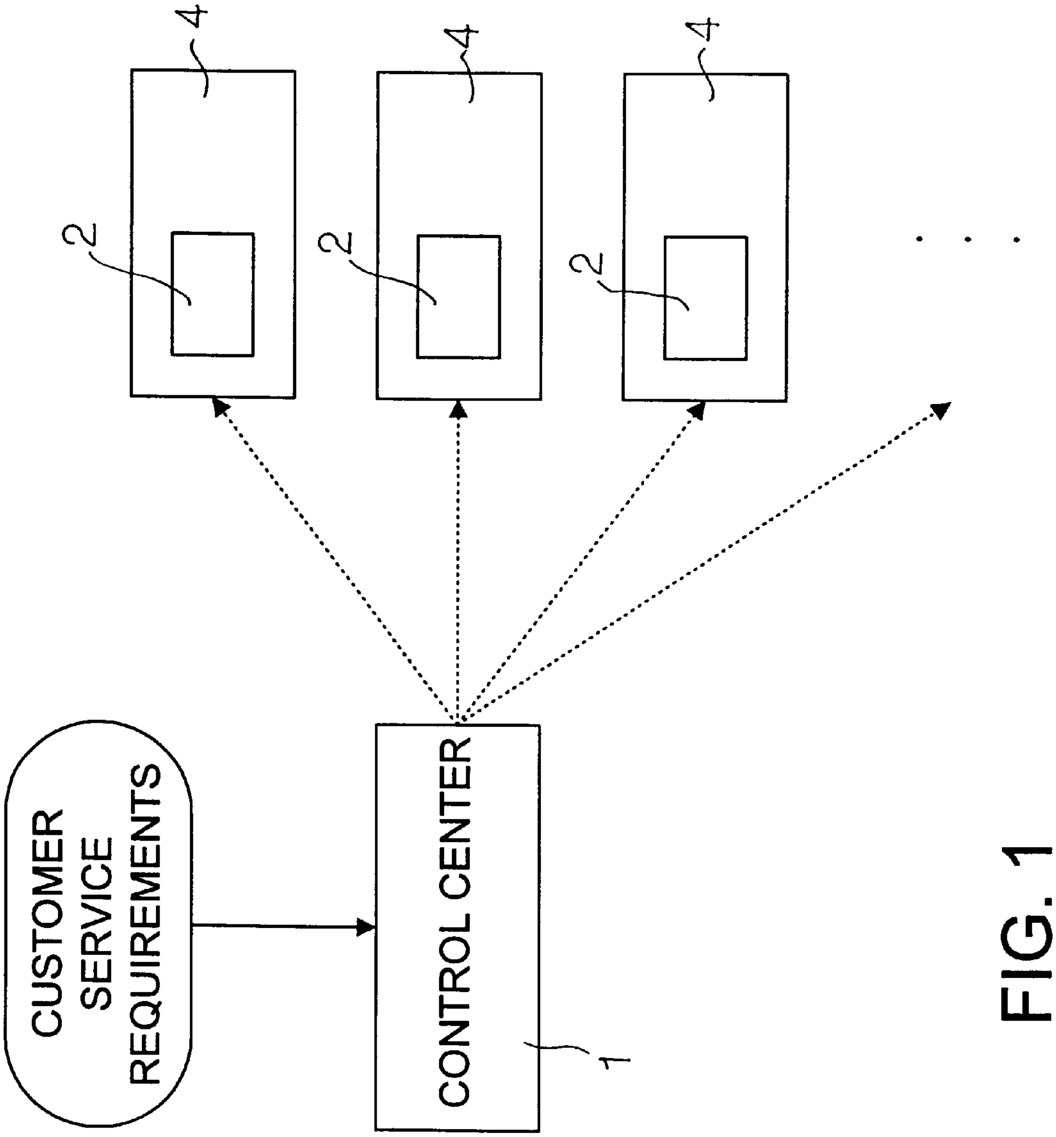
FIG. 1 is a schematic view of an embodiment of the invention.
Figure 2:
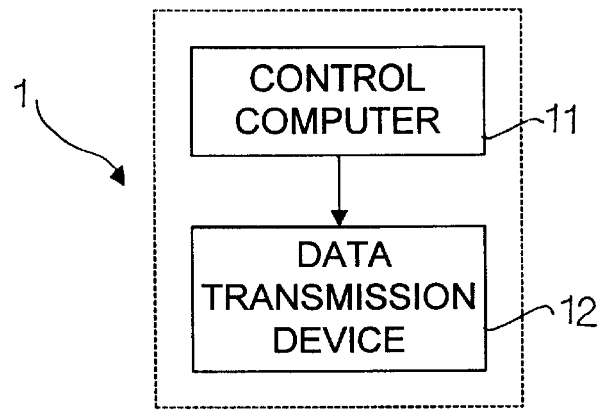
FIG. 2 is a block diagram of a control center of the invention.

Referring to FIG. 1 for an embodiment of the invention, the vehicle dispatching system of the invention provides dispatch communication control between vehicles and a control center, and mainly includes a control center 1 to control dispatching communication for at least one vehicle 4. Every vehicle 4 is equipped with a car phone 2 (referring to FIG. 2). The control center 1 includes at least a control computer 11 and a data transmission device 12. Software resided in the control computer 11 can perform mission information coding and display information, current mission schedules, and performing status of dispatched vehicles. The data transmission device 12 may be coupled with an existing broadcast system including GSM handsets and paging services established by telecommunication companies.

Figure 3:
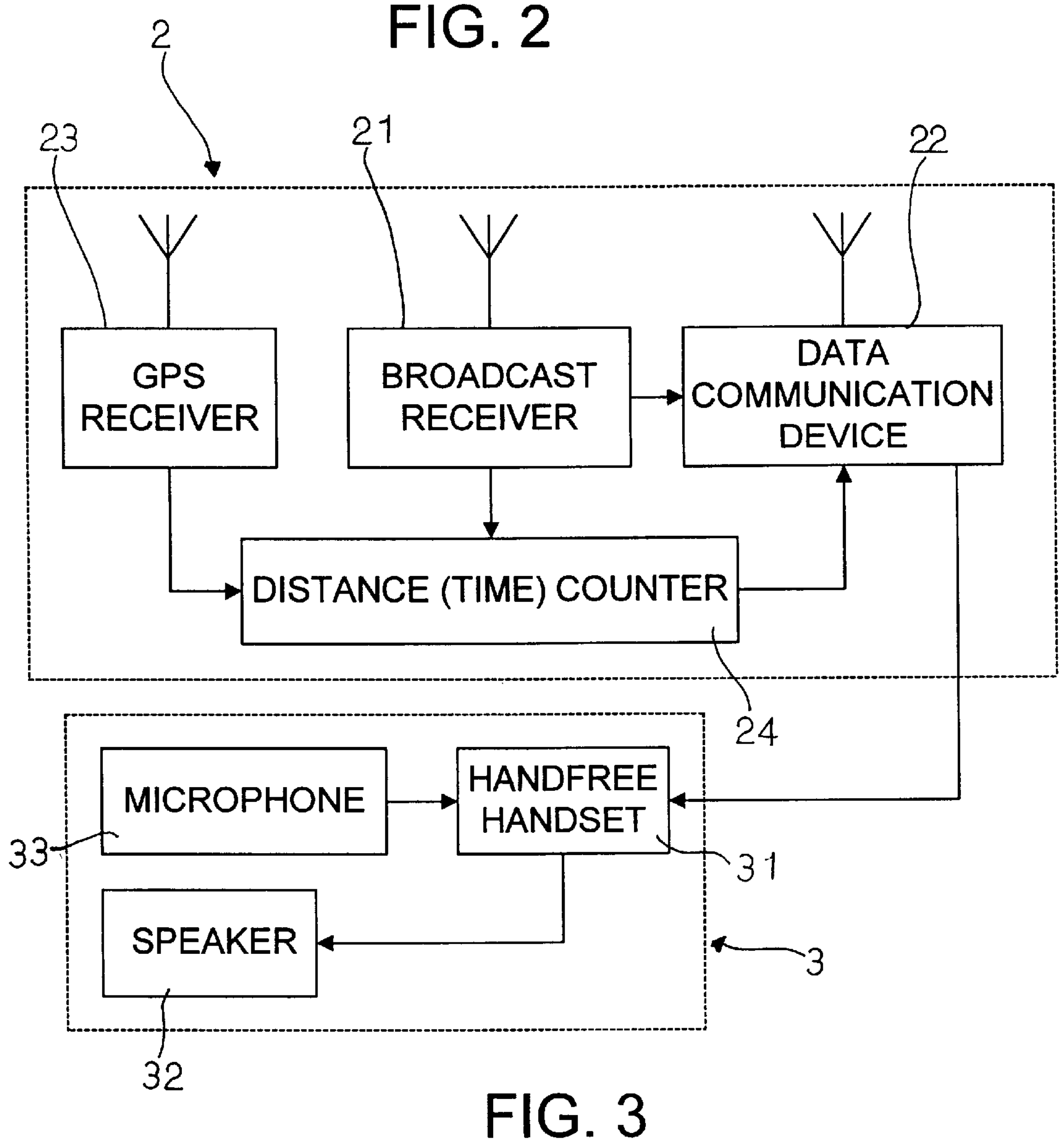
FIG. 3 is a block diagram of a car phone in the vehicle of the invention.

Referring to FIG. 3, the car phone 2 consists of:

- a broadcast receiver 21 for receiving broadcast information from the control center;
- a data communication device 22 for transmitting and receiving data and information;
- a GPS receiver 23 for receiving positioning signals emitting from positioning satellites stationed on earth obits; and
- a distance (time) counter 24 for calculating relative distances between vehicle locations and the mission location.

The car phone 2 may be coupled with a handfree handset device 3 which includes a handfree handset 31 which in turn has a microphone 33 and a speaker 32 for entering voice speech or delivering voice speech output to perform conversation operations for the handfree handset.

When the control center 1 receives customer service requests for vehicle services, the control computer 11 of the control center 1 calculates longitude and latitude coordinates of customer location based on customer input and through electronic maps, then through the data transmission device 12 outputs broadcast signals. The broadcast receiver 21 on the car phone 2 receives the broadcast signals, and compares with the longitude and latitude coordinates of the vehicle received from the GPS receiver 23, transfers to the distance (time) counter 24 to calculate the distance between the vehicle and the customer, and based on the distance to determine return call delay time for transmitting information to the control center 1. As the vehicle nearest the customer has a higher possibility of calling back earlier and communicating successfully first while vehicles located at longer distances have higher possibility of calling back later and not able to access the occupied communication links, when the control center 1 accepts the first return call, it lifts the original mission commands and orders call back cancellations for those car phones that are located at longer distances and do not respond, and those car phones having tried to call back but are delayed due to line busy will be revoked and treated as invalid calls. Hence the vehicle 4 at the nearest distance is dispatched at minimum communication costs to resolve the dispatching problems incurred to conventional vehicle dispatching systems.

Figure 4:
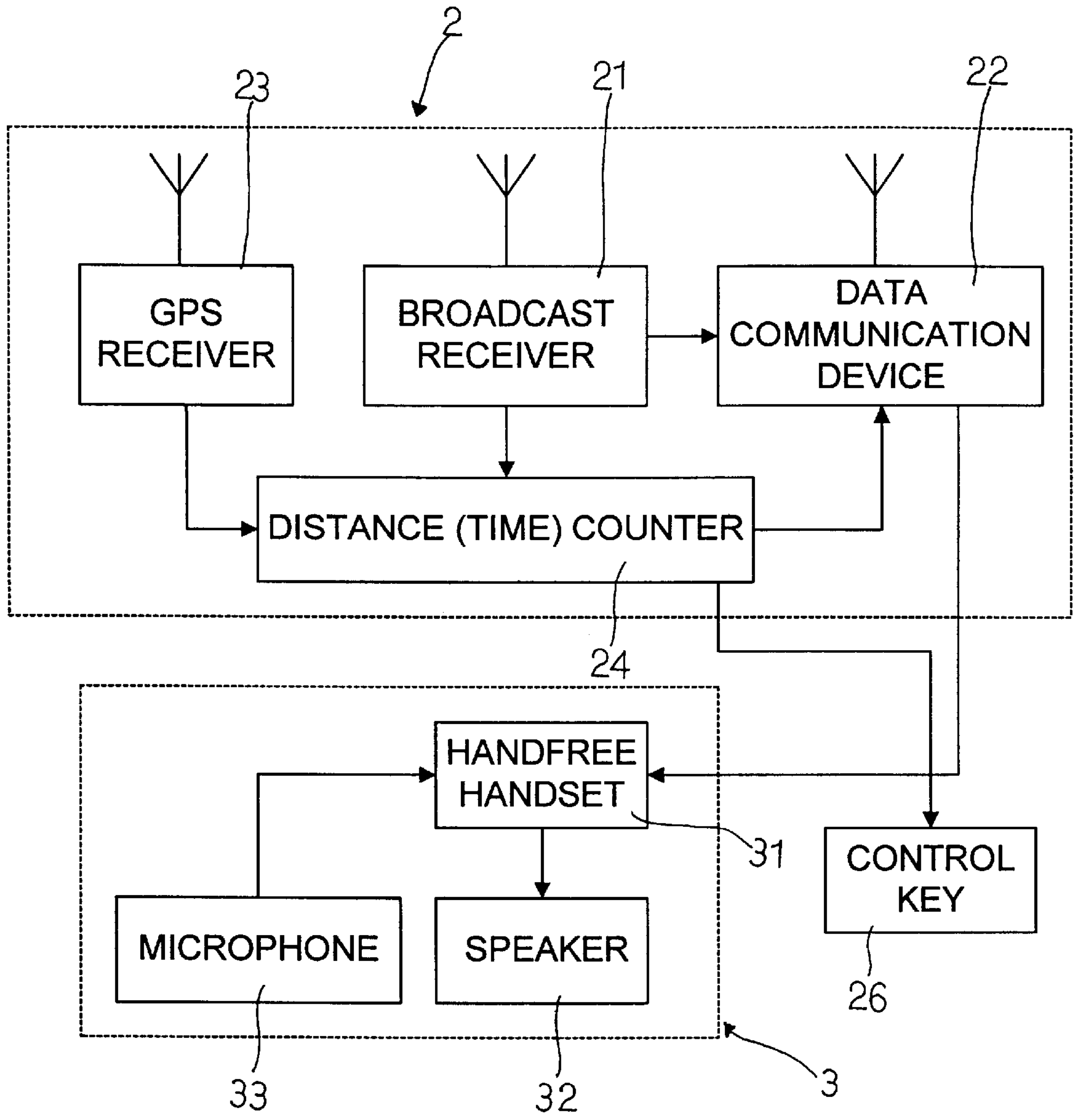
FIG. 4 is a block diagram of a second embodiment of a car phone in the vehicle of the invention.

Referring to FIG. 4, the car phone 2 equipped in the vehicle 4 may have a control key 26. When the driver does not want to accept the dispatched commands, the driver can depress the control key 26 to stop return call when hearing the new dispatch mission from broadcast, or verbally inform the control center 1 when receiving the dispatch order so that the control center 1 may repeat broadcasting.

Figure 5:
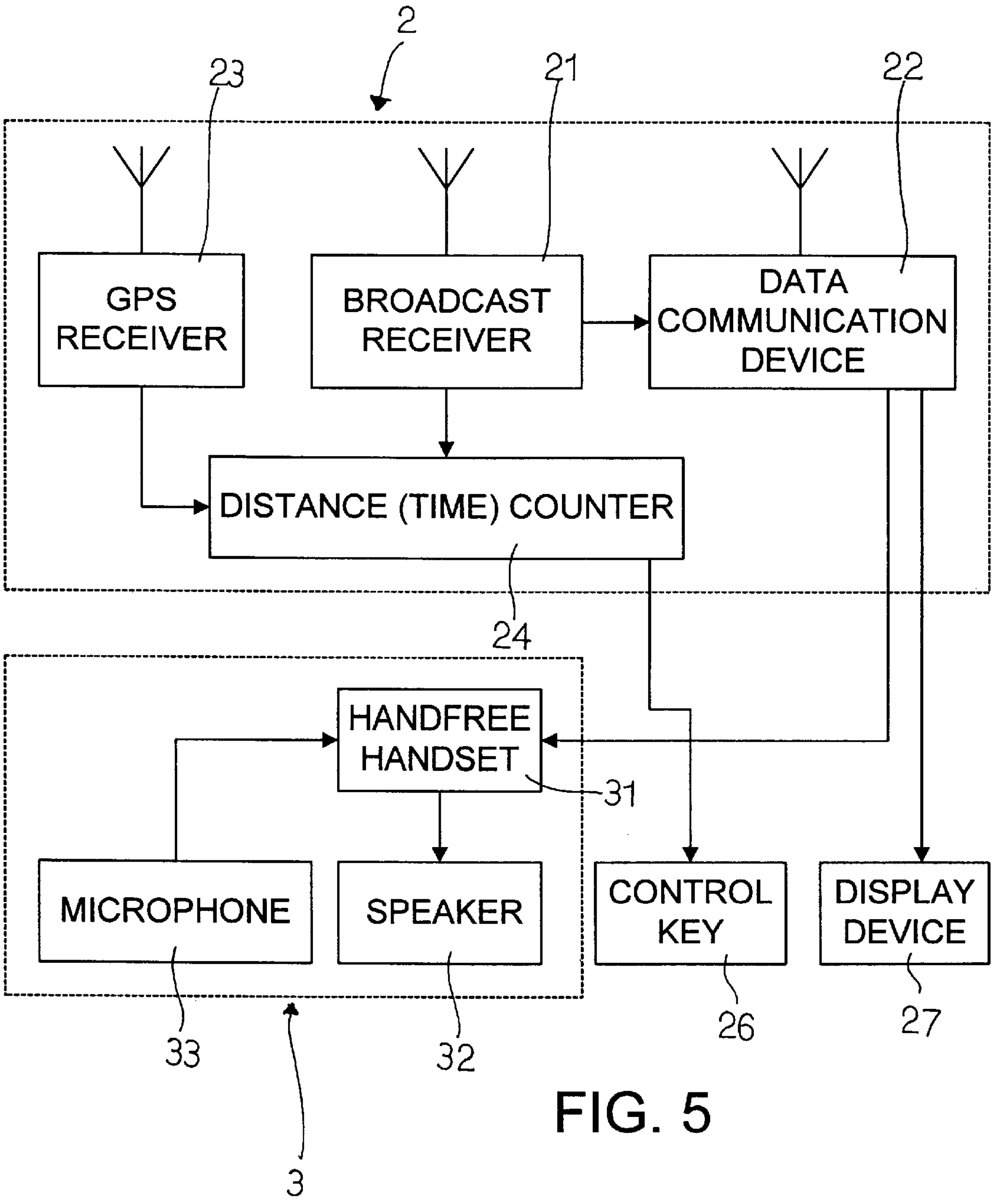
FIG. 5 is a block diagram of a third embodiment of a car phone in the vehicle of the invention.

Referring to FIG. 5, the car phone 2 in the vehicle 4 may also include a display device 27 for displaying dispatch contents such as start location and destination of dispatching and other related data.

Figure 6:
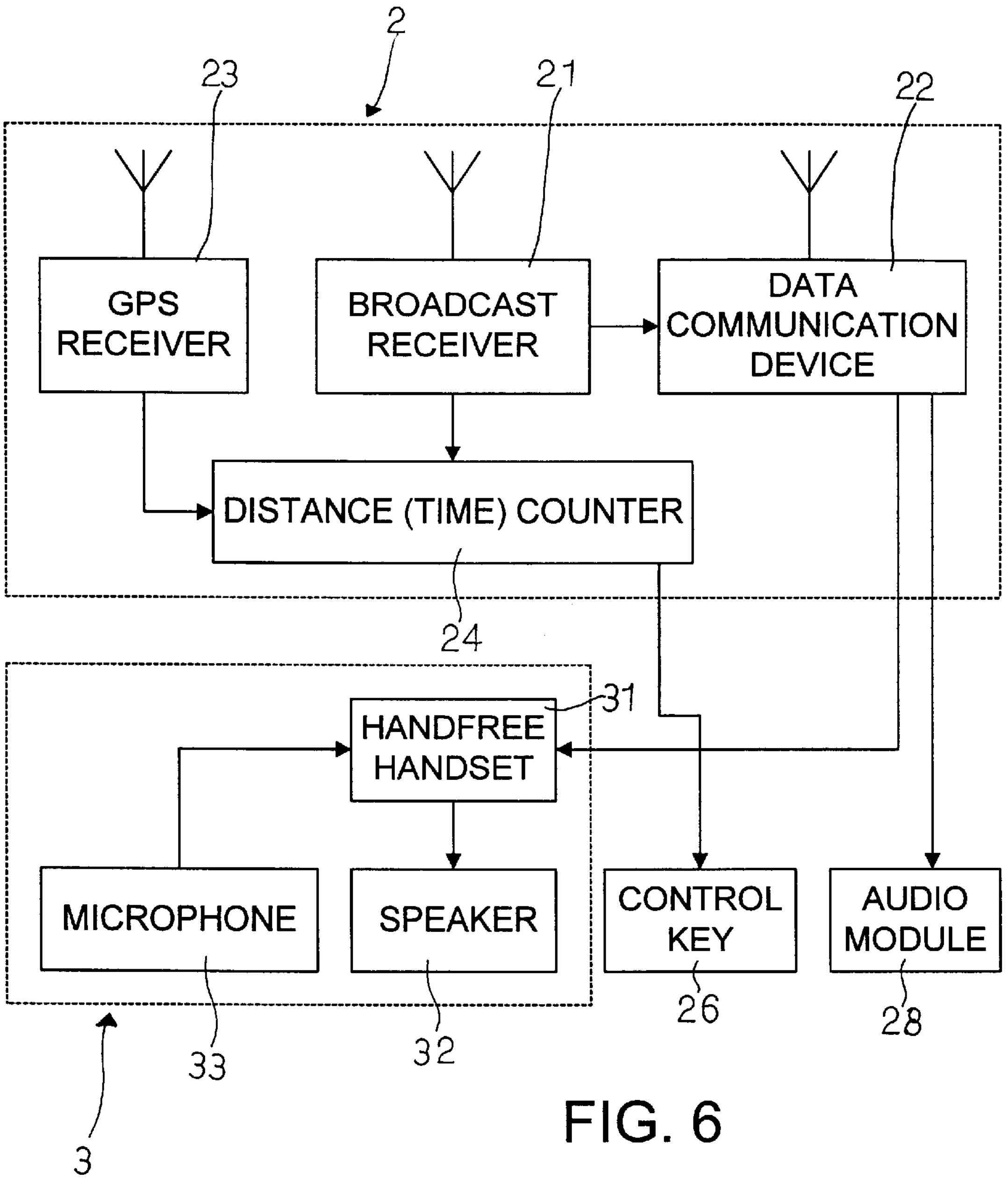
FIG. 6 is a block diagram of a fourth embodiment of a car phone in the vehicle of the invention.

Referring to FIG. 6, the car phone 2 in the vehicle 4 may also include an audio module 28 to output broadcast signals in voice speech.

Figure 7:
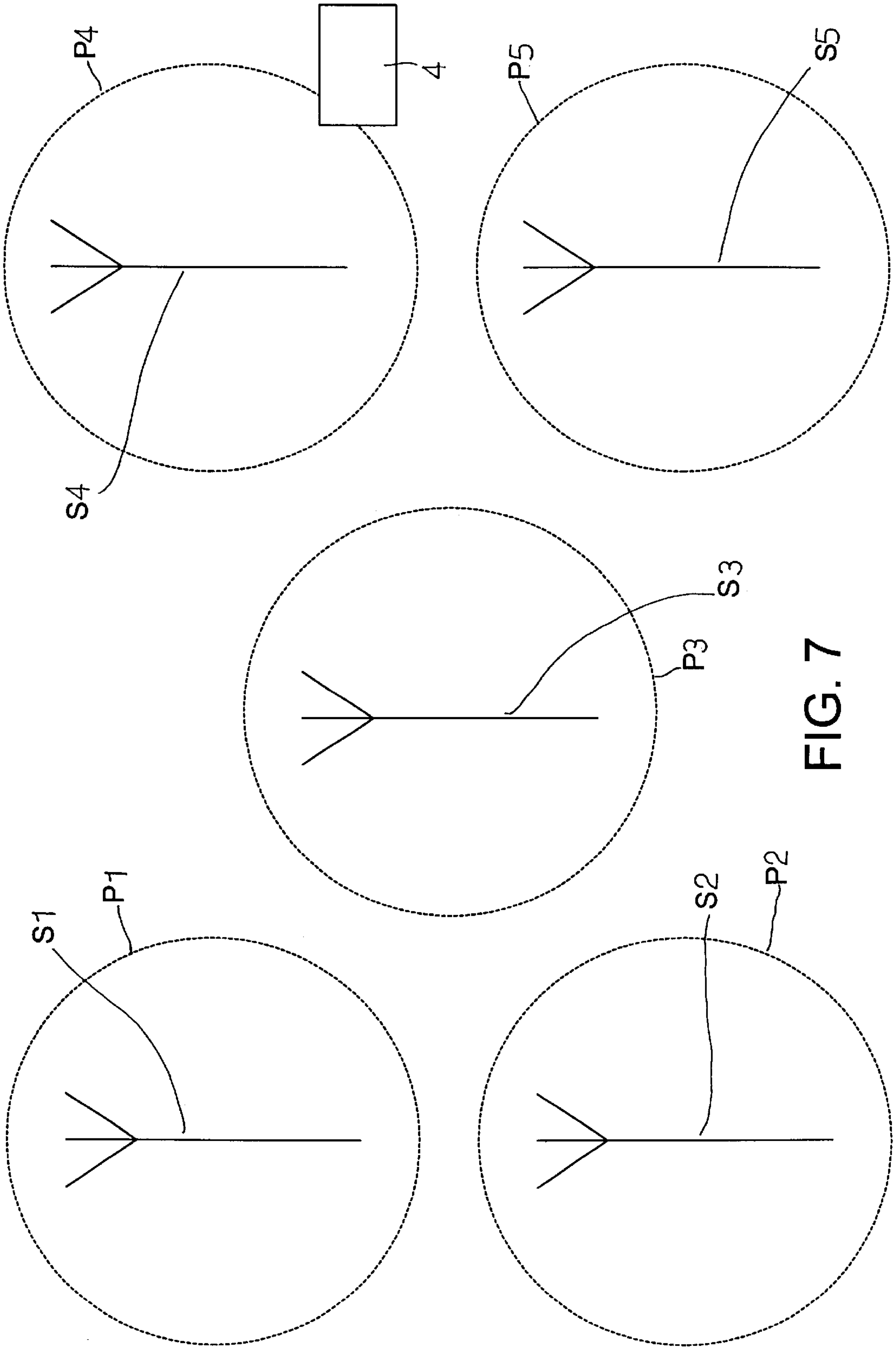
FIG. 7 is a schematic view of a base station with multiple cells.

Referring to FIG. 7, the system of the invention may also be coupled with GSM handsets of existing telecommunication companies and paging services broadcasting system. The base stations of the telecommunication companies mostly are constructed in a multiple cells fashion and include at least one base station S1, S2, S3, S4, S5. When there is a request for dispatching vehicle, the base stations in the neighborhood of the vehicles may be used to broadcast dispatch signals. If there is no response from any vehicle in the effective areas P1, P2, P3, P4, P5 of the base stations, the broadcast scope may be extended (i.e. to increase more base stations for transmitting signals). Thus as long as there are vehicles in the targeted area available for dispatching, vehicles at longer distances do not need to call back to reduce unnecessary communications.

Figure 8A:
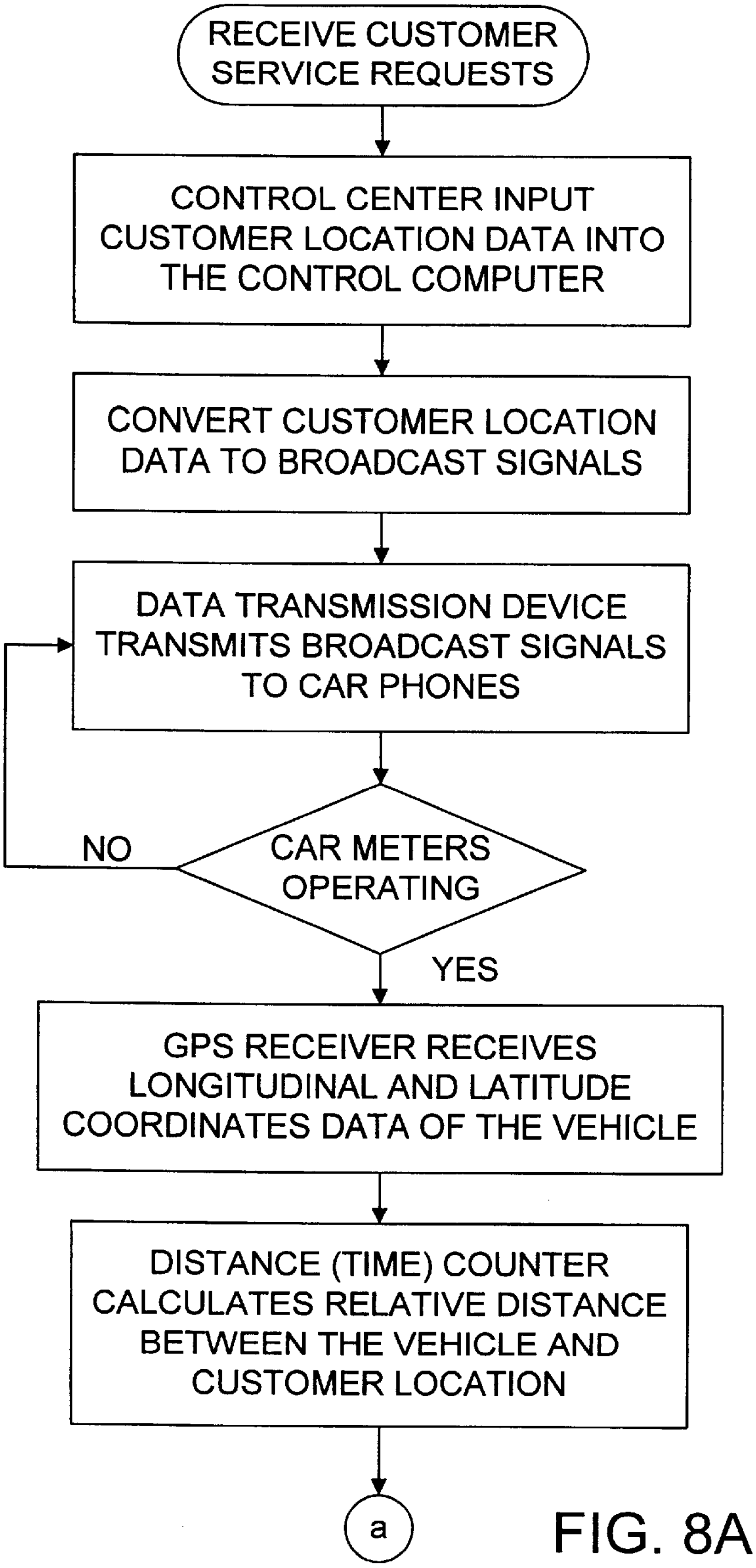
FIGS. 8A and 8B are process flow chart of the vehicle dispatching method of the invention.
Figure 8B:
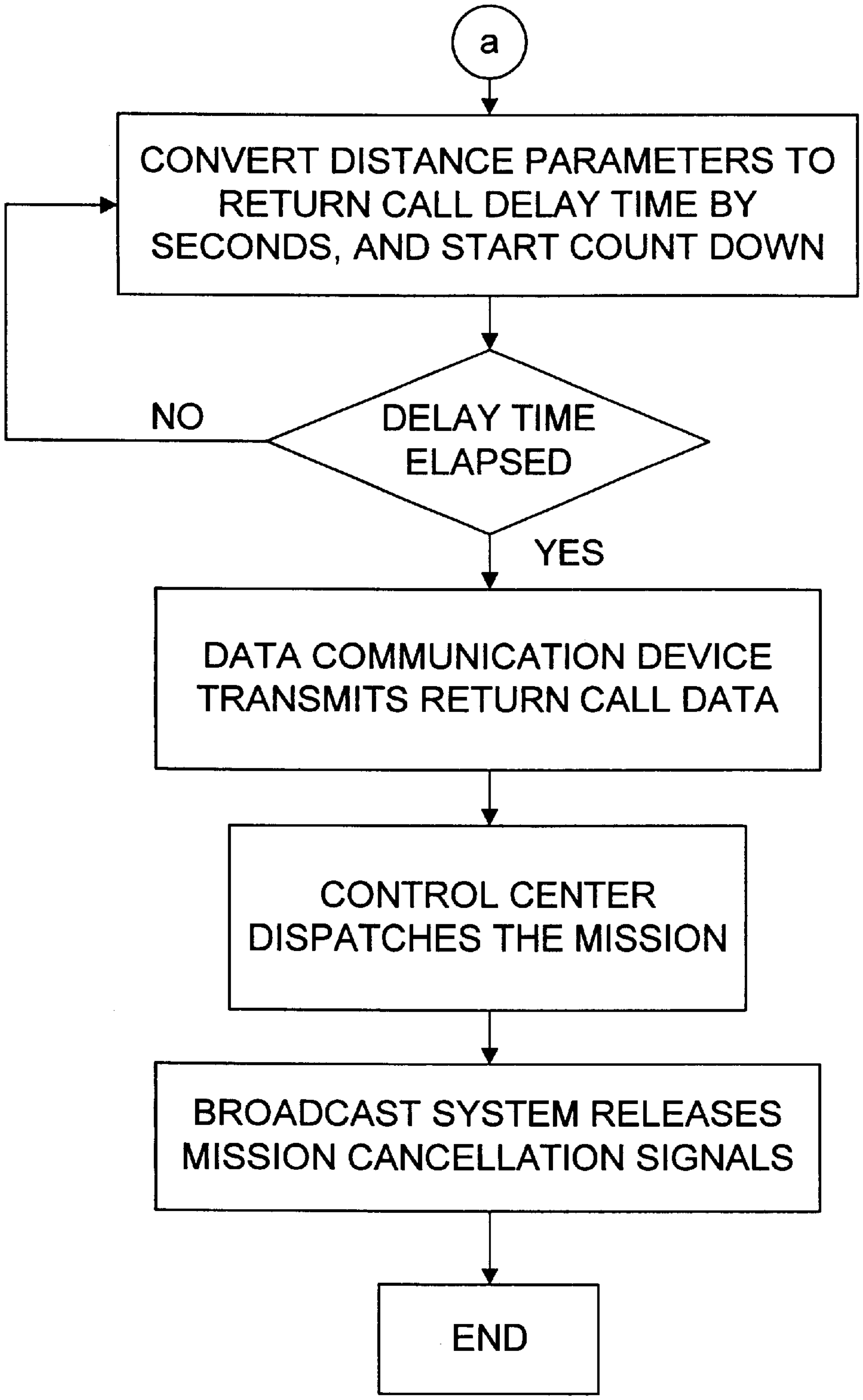

The vehicle dispatching method of the invention (referring to FIGS. 8A and 8B) includes the steps of:

1. customers call by telephone to the control center 1 requesting vehicle services, and service people inquire customer locations (such as the intersection of Chungshiao East Road and Hsingshan South Road) and destinations (such as Shunshan Airport);
2. dispatching service people enter customer locations data into the control computer 11 (such as the intersection of Chungshiao East Road and Hsingshan South Road), and software in the control computer 11 convert customer locations to broadcast signals which may include contents of: mission number, customer locations longitudes and latitudes, destinations, return call channels or extensions. The broadcast signals are transmitted through the data transmission device 12 to the car phones 2 of the vehicles 4.
3. In the event that the meters in the vehicles are in operating conditions, the broadcasting signals from the control center 1 is ignored. In contrast, if the meter in the vehicle 4 are not in operating conditions, the broadcast receiver 21 of the car phone 2 receives the broadcasting signals from the broadcasting system of the control center 1, the distance (time) counter 24 receives longitude and latitude data of the vehicle from the GPS receiver 23 and calculates relative distance with the customer after comparing with customer location data contained in the broadcasting signals (the steps may also be: the broadcast receiver of the car phone in the vehicle receives broadcasting signals emitting from the broadcasting system of the control center, the distance (time) counter receives longitude and latitude data of the vehicle from the GPS receiver and calculates relative distance with the customer after comparing with customer location data contained in the broadcasting signals).
4. the distance (time) counter 24 converts the obtained distance to return call delay time by seconds (such as one second delay for one hundred meters, five seconds delay for five hundred meters, etc.), and through the data communication device 22 to transmit the longitude and latitude data of the vehicle 4 location to the control center 1 when the delay time is elapsed;
5. people in the control center 1 receive the return call from the vehicle 4, and inform related information of the customer such as customer locations and destinations, other delayed return call vehicles 4 cannot call back due to line busy or time delays are not elapsed.
6. the control center 1, after finishes mission dispatching, employs again the broadcast system to cancel the command broadcasting signals (signal contents could be: mission number, cancellation) so that all other vehicles 4 which have received the broadcast signals but do not respond with return calls can stop calling back.

In summary, the method for a vehicle dispatching system of the invention can dispatch the nearest available vehicle to provide customer's required services at minimum communication costs, and avoid vehicle dispatching problems.

I claim:

1. A method for a vehicle dispatching system comprising the steps of:

(1) customers calling by telephone to a control center requesting vehicle services, and service people inquiring customers locations and destinations;

(2) dispatching service people entering customer location data into a control computer, and software resided in the control computer converting customer location data to broadcast signals which are transmitted through a data transmission device to car phones installed in the vehicles;

(3) broadcast receivers installed in the car phones receiving the broadcast signals transmitting from a broadcast system of the control center, and distance (time) counters installed in the car phones receiving longitude and latitude data of the vehicles from GPS receivers installed in the car phones and calculating relative distances with the customers after comparing with the customer location data contained in the broadcast signals;

(4) the distance (time) counters converting the obtained relative distances to return call delay times by seconds, and through data communication devices transmitting the longitude and latitude data of the vehicles to the control center when the delay times are elapsed;

(5) people in the control center receiving return calls from the vehicles, and informing customers related information including customer locations and destinations, other return call delayed vehicles being rejected from calling back to the control center resulting from line busy or undue time delay; and (6) the control center, after finishing mission dispatching, employing again the broadcast system to cancel command broadcasting signals to stop all other vehicles which have received the broadcast signals but do not respond with return calls from calling back.

* * * * *